(12) United States Patent
Kukreja et al.

(10) Patent No.: US 11,588,987 B2
(45) Date of Patent: Feb. 21, 2023

(54) NEUROMORPHIC VISION WITH FRAME-RATE IMAGING FOR TARGET DETECTION AND TRACKING

(71) Applicant: Sensors Unlimited, Inc., Princeton, NJ (US)

(72) Inventors: Sunil L. Kukreja, Avon, CT (US); Joseph V. Mantese, Ellington, CT (US); Olusequin T. Oshin, Manchester, CT (US); John Liobe, New York, NY (US); John S. Murphy, Wilbraham, MA (US)

(73) Assignee: Sensors Unlimited, Inc., Princeton, NJ (US)

( * ) Notice: Subject to any disclaimer, the term of this patent is extended or adjusted under 35 U.S.C. 154(b) by 423 days.

(21) Appl. No.: 16/591,310

(22) Filed: Oct. 2, 2019

(65) Prior Publication Data

US 2021/0105421 A1    Apr. 8, 2021

(51) Int. Cl.
  *H04N 5/33*    (2006.01)
  *G06N 20/10*   (2019.01)
  (Continued)

(52) U.S. Cl.
  CPC ............... *H04N 5/33* (2013.01); *G06N 3/063* (2013.01); *G06N 3/08* (2013.01); *G06N 20/10* (2019.01);
  (Continued)

(58) Field of Classification Search
  USPC ........................................................ 348/164
  See application file for complete search history.

(56) References Cited

U.S. PATENT DOCUMENTS 10,140,826 B2   11/2018   Jeon et al.
10,175,030 B2   1/2019    Lund et al.
(Continued)

FOREIGN PATENT DOCUMENTS

KR   20160072477 A    6/2016
TW     201837854 A   10/2018
(Continued)

OTHER PUBLICATIONS

Extended European Search Report and Written Opinion for European Patent Application No. EP 19216599.1, dated Dec. 2, 2020.
(Continued)

*Primary Examiner* — Behrooz M Senfi
(74) *Attorney, Agent, or Firm* — Locke Lord LLP; Scott D. Wofsy; Judy R. Naamat

(57) ABSTRACT

An imaging system and a method of imaging are provided. The imaging system includes a single optics module configured for focusing light reflected or emanated from a dynamic scene in the infrared spectrum and a synchronous focal plane array for receiving the focused light and acquiring infrared images having a high spatial resolution and a low temporal resolution from the received focused light. The imaging system further includes an asynchronous neuromorphic vision system configured for receiving the focused light and acquiring neuromorphic event data having a high temporal resolution, and a read-out integrated circuit (ROIC) configured to readout both the infrared images and event data.

24 Claims, 14 Drawing Sheets

(51) Int. Cl.
　　*G06N 3/063* (2023.01)
　　*G06N 3/08* (2023.01)
　　*G06T 7/20* (2017.01)
(52) U.S. Cl.
　　CPC ...... *G06T 7/20* (2013.01); *G06T 2207/20081* (2013.01)

(56) References Cited

U.S. PATENT DOCUMENTS

| | | | |
|---|---|---|---|
| 10,302,420 | B2 | 5/2019 | Brandli et al. |
| 10,345,447 | B1* | 7/2019 | Hicks ............... G01S 7/4863 |
| 2002/0149693 | A1 | 10/2002 | Tantalo et al. |
| 2011/0243442 | A1* | 10/2011 | Agrawal ............ H04N 5/341 382/173 |
| 2013/0278868 | A1* | 10/2013 | Dunn ................ G02F 1/13318 362/97.1 |
| 2016/0057366 | A1 | 2/2016 | Lee et al. |
| 2018/0041727 | A1 | 2/2018 | Lund et al. |
| 2018/0225521 | A1* | 8/2018 | Harris ................ G01S 17/04 |
| 2018/0266887 | A1 | 9/2018 | Frank et al. |
| 2019/0007678 | A1 | 1/2019 | Perez-Ramirez et al. |
| 2019/0158769 | A1* | 5/2019 | Walsh ................ H04N 5/361 |
| 2021/0168372 | A1* | 6/2021 | Zhao ................. H04N 19/167 |

FOREIGN PATENT DOCUMENTS

| | | | |
|---|---|---|---|
| WO | WO-2017213468 | A1 | 12/2017 |
| WO | WO-2020152655 | A1 * | 7/2020 ............ G06F 1/1626 |

OTHER PUBLICATIONS

Gallego, G., et al.: "Event-based Vision: A Survey", Apr. 17, 2019 (Apr. 17, 2019), pp. 1-25, XP055752750, Retrieved from the Internet: URL: https://arxiv.org/pdf/1904.08405v1.pdf [retrieved on Nov. 20, 2020].
Gehrig, D., et al.: "Asynchronous, Photometric Feature Tracking using Events and Frames", arxiv.org, Cornell University Library, 201 Olin Library Cornell University Ithaca, NY 14853, Jul. 25, 2018 (Jul. 25, 2018), XP081118977, DOI: 10.1007/978-3-030-01258-8_46.
Lin, W., et al.: "Event-Based High Dynamic Range Image and Very High Frame Rate Video Generation Using Conditional Generative Adversarial Networks", 2019 IEEE/CVF Conference on Computer Vision and Pattern Recognition (CVPR), IEEE Jun. 15, 2019 (Jun. 15, 2019), pp. 10073-10082, XP033687410, DOI: 10.1109/CVPR. 2019.01032 [retrieved on Jan. 8, 2020].
Partial European Search Report for European Patent Application No. EP19216599.1, dated Jul. 28, 2020.
Delbruckl, T., et al., "Neuromorophic vision sensing and processing", ESSCIRC Conference 2016: 42nd European Solid-State Circuits Conference, IEEE, Sep. 12, 2016 (Sep. 12, 2016), pp. 7-14, XP032980798, DOI: 10.1109/ESSCIRC.2016.7598232 [retrieved on Oct. 18, 2016]; the entire document.
Berner, R., et al., "A 240x180 120dB 10mW 12us-latency sparse output vision sensor for mobile applications", Proc. 2013 Intl. Image SensorWorkshop, 2013, pp. 1-4, XP055716381, Retrieved from the Internet: URL:http://www.imagesensors.org/Past% 20Workshops/2013%20Workshop/2013%20Papers/03-1_005-delbruck_ paper.pdf [retrieved on Jul. 20, 2020] Jul. 20, 2020]; abstract, section I. Introduction.
Lichtsteiner, P., et al., "A 128×128 120 dB 15 μs Latency Asynchronous Temporal Contrast Vision Sensor," IEEE J. Solid-State Circuits, vol. 43, No. 2, pp. 566-576, 2008.
Khosla, D., et al., "A neuromorphic system for video object recognition". Frontiers in computational neuroscience, 8, p. 147, 2014.
Giulioni, M., et al., "Event-based computation of motion flow on a neuromorphic analog neural platform". Frontiers in neuroscience, 10, p. 35, 2016.
Mishra, A., et al., "A saccade based framework for real-time motion segmentation using event based vision sensors". Frontiers in neuroscience, 11, p. 83, 2017.
Afshar, S., et al., "Investigation of event-based memory surfaces for high-speed tracking, unsupervised feature extraction and object recognition". arXiv preprint arXiv:1603.04223, 2016.
Benosman, R., et al., "Asynchronous frameless event-based optical flow". Neural Networks, 27, pp. 32-37, 2012.
Klein, P., et al., "Scene stitching with event-driven sensors on a robot head platform." In 2015 IEEE International Symposium on Circuits and Systems (ISCAS) (pp. 2421-2424). IEEE, May 2015.
Lagorce, X., et al., "Asynchronous event-based multikernel algorithm for high-speed visual features tracking". IEEE transactions on neural networks and learning systems, 26(8), pp. 1710-1720, 2014.
Goodfellow, I., et al., "Generative Adversarial Networks. Proceedings of the International Conference on Neural Information Processing Systems". NIPS 2014. pp. 2672-2680.
Valeiras, D.R., et al., "An asynchronous neuromorphic event-driven visual part-based shape tracking". IEEE transactions on neural networks and learning systems, 26(12), pp. 3045-3059, 2015.
Office Action for Taiwanese Patent Application No. TW108145667, dated Sep. 30, 2022.
Taiwanese Office Action for Taiwanese Patent Application No. TW108145667, dated Nov. 24, 2022.

* cited by examiner

NEUROMORPHIC VISION WITH FRAME-RATE IMAGING FOR TARGET DETECTION AND TRACKING

BACKGROUND

1. Field of the Disclosure

The present disclosure relates to neuromorphic vision with frame-rate imaging and more particularly, to target detection and tracking using a combination of neuromorphic vision with frame-rate imaging.

2. Description of Related Art

A frame-rate imaging system employs a synchronous (framed) sensor for sensing and outputting intensity images at a predefined framerate. The intensity images have a high spatial resolution and a low temporal resolution that consumes a large amount of power, memory, and bandwidth. A small increase in temporal resolution can cause an exponential increase in memory and bandwidth consumption.

Neuromorphic vision employs an asynchronous (i.e., frameless) sensor for passive sensing that outputs local pixel-level changes caused by movement of a target at a time of occurrence. Neuromorphic vision provides a low-power and low-bandwidth solution for outputting a small amount of data in response to sensing movement at a very high temporal resolution. While spatial resolution capability may increase in the future, at present, neuromorphic vision data has low spatial resolution. Although the small amount of data output provides limited information about the target, neuromorphic vision provides advantages for detecting and tracking movement.

However, development of neuromorphic vision has been limited to constrained laboratory experiments. Such experiments tend to make assumptions about deployment conditions, such as (1) minimal scene clutter, (2) single slow moving object to be identified and tracked, (3) narrow field of view, and/or (4) close proximity or known location of objects of interest. However, in a real-world scenario for applications such as intelligence, surveillance and reconnaissance (ISR), there is a need to track multiple high-speed targets from a high altitude with possibly significant background clutter, such as due to clouds, terrain, and camouflage.

While conventional methods and systems have generally been considered satisfactory for their intended purpose, there is still a need in the art for a system and method that can combine a frame-rate imaging system and a neuromorphic vision system for ISR using constrained resources, with the ability to do so in real-world conditions and from high altitudes.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in accordance with one aspect of the disclosure, an imaging system is provided. The imaging system includes a single optics module configured for focusing light reflected or emanated from a dynamic scene in the infrared spectrum and a synchronous focal plane array for receiving the focused light and acquiring infrared images having a high spatial resolution and a low temporal resolution from the received focused light. The imaging system further includes an asynchronous neuromorphic vision system configured for receiving the focused light and acquiring neuromorphic event data having a high temporal resolution. The combined infrared and neuromorphic system has a read-out integrated circuit (ROIC) configured to readout both the infrared images and event data.

In accordance with another aspect of the disclosure, a method is provided for imaging. The method includes focusing light reflected or emanated from a dynamic scene in the infrared spectrum and synchronously acquiring from the focused light infrared images having a high spatial resolution and a low temporal resolution from the received focused light. The method further includes asynchronously acquiring from the focused light event data having a high temporal resolution, and reading out both the infrared images and event data.

In accordance with a further aspect of the disclosure, an imaging system for imaging a target is provided. The imaging system includes a synchronous focal plane array for receiving the focused light and synchronously acquiring intensity images, wherein the intensity images have a high spatial resolution and a low temporal resolution from the received focused light. The imaging system further includes an asynchronous neuromorphic vision system configured for receiving the focused light and asynchronously acquiring event data, the event data having a high temporal resolution. A ROIC is provided, wherein the ROIC is configured to readout both the intensity images and event data, wherein the focal plane array and the ROIC are initially configured for acquiring and reading out the intensity images at a low framerate. The imaging system further includes at least one processing module configured for monitoring the event data asynchronously for detecting an event. In response to detection of the event, the processing module is further configured for controlling at least one of the focal plane array and the ROIC to increase the framerate at which the intensity images are acquired or read out from a first frame rate to a second frame rate.

In accordance with still another aspect of the disclosure, a method is provided for processing intensity images of a dynamic scene acquired using a template and asynchronously acquired event data, wherein the event data is acquired responsive to light reflected or emanated from a scene using a neuromorphic vision system, and the acquired event data has a high temporal resolution. The method includes receiving a template, wherein the template is determined by machine learning training. Furthermore, the template includes a plurality of entries, each entry including trained event data that is correlated with one or more trained intensity images. The correlated trained event and one or more trained intensity images were acquired in response to light reflected or emanated from the same scene at the same time, wherein the trained intensity images are associated with one or more respective possible targets of interest. The trained intensity images were synchronously acquired from an FPA and have a high spatial resolution and a low temporal resolution. The trained event data were asynchronously acquired from the neuromorphic vision system and have a high temporal resolution. The method includes receiving a query including query event data or query intensity image data, determining an entry in the template that includes trained event data or a trained intensity image that is most similar to the query, and using the correlated trained intensity image or trained event data of the entry to identify, detect, or track a target.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
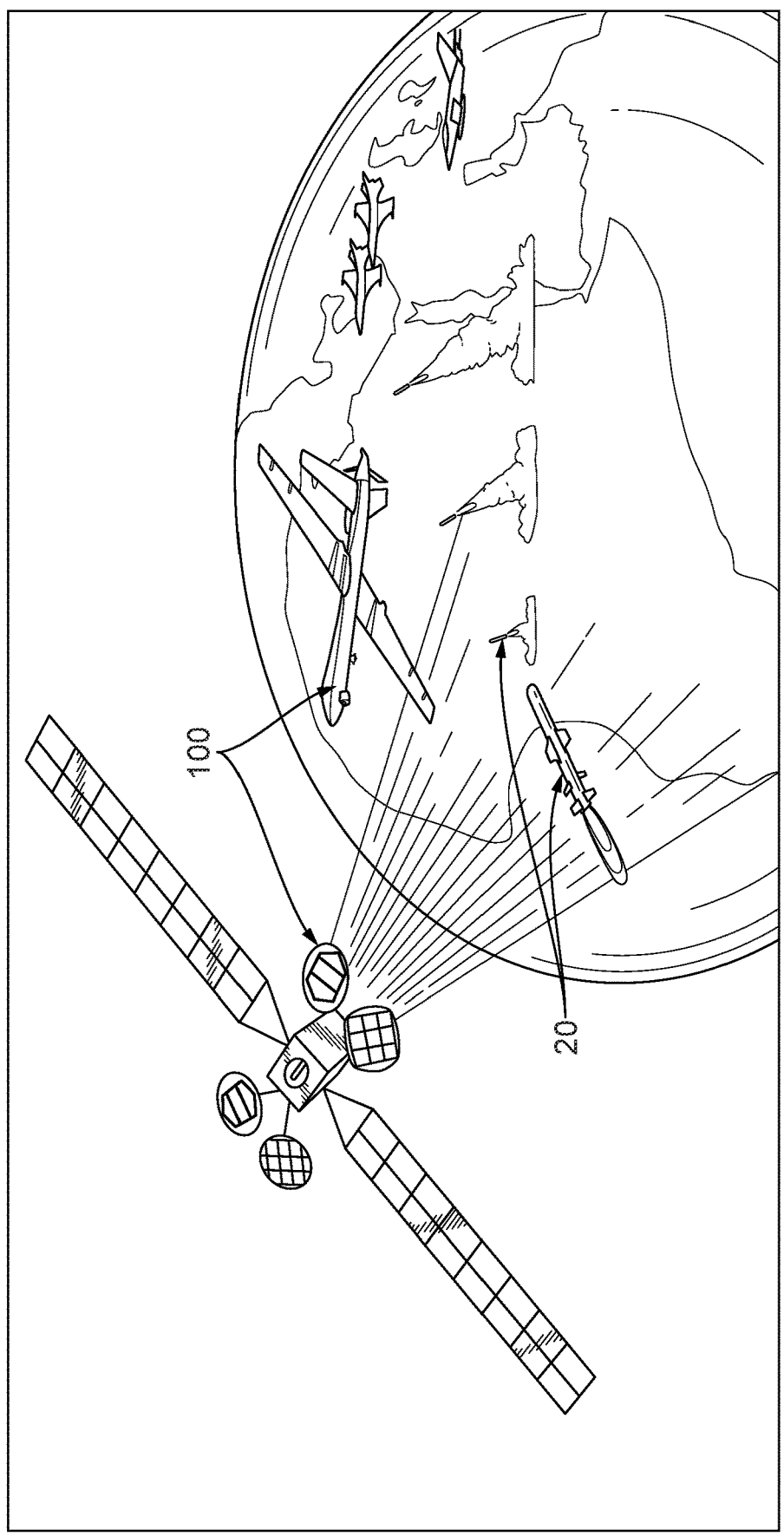
FIG. 1 is a schematic diagram of a vision system deployed in an operating environment in accordance with an embodiment of the disclosure.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this present disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary vision system 100 in which below illustrated embodiments may be implemented. Vision system 100 can be mounted to a stationary or mobile platform 10. Objects 20 of a scene viewable by the vision system 100 can be stationary or mobile. The scene can be dynamic due to movement of the platform 10 or the objects 20. In an example, vision system 100 platform 10 can be a manned or unmanned airborne, space borne, land borne, or sea borne craft.

Vision system 100 uses event-based vision that detects events and provides the ability to detect and track objects 20 (also referred to as targets) at a high temporal resolution, even when the platform 10 and/or the target 20 are stationary or moving objects, including rapidly moving objects. Vision system 100 uses synchronous intensity images sensed by a focal plane array that can be controlled based on event detection and/or combined with machine learning to enhance target detection, target tracking, and/or scene reconstruction. These enhancements enable vision system 100 to detect and track targets 20 from a far distance, such as from a high altitude, including when a target 20 is partially occluded. By combining event-based vision with synchronous acquisition of intensity images, vision system 100 is configured to minimize power consumption and can accommodate low data processing and data transfer requirements.

Figure 2:
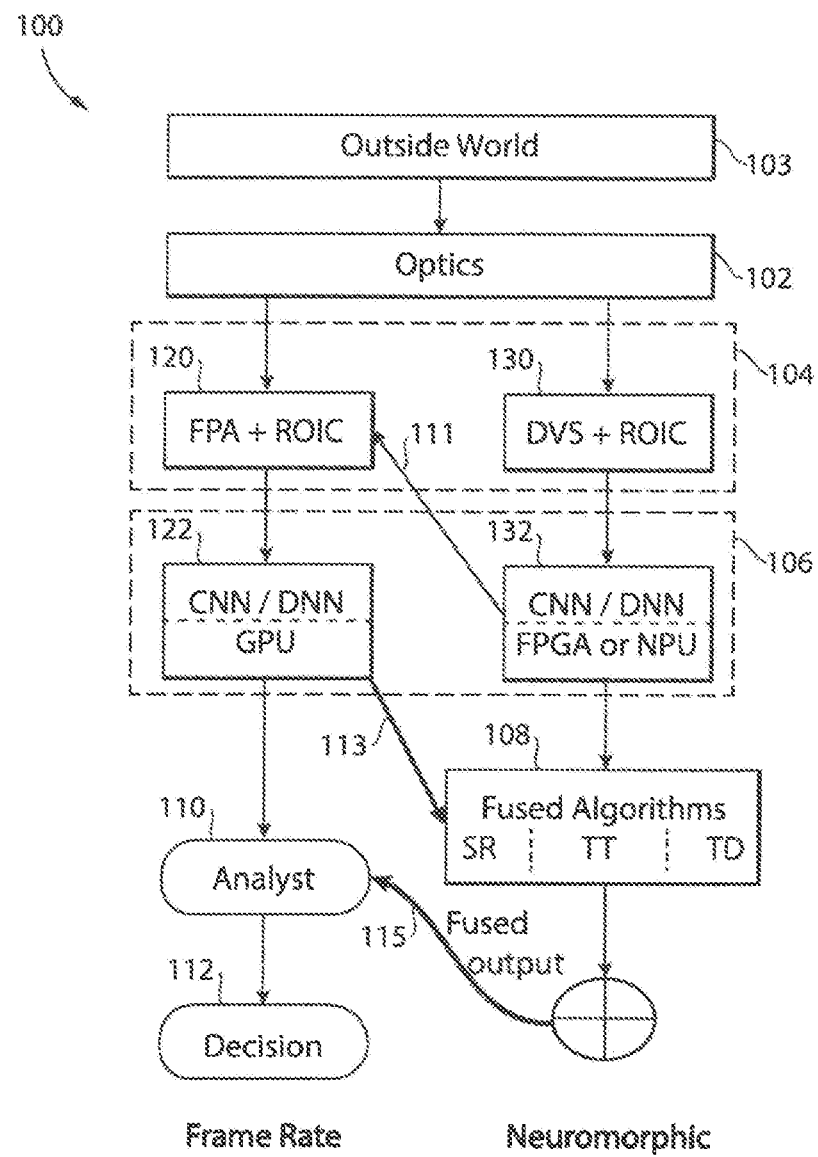
FIG. 2 is a block diagram of a vision system in accordance with an embodiment of the disclosure.

With reference to FIG. 2, vision system 100 includes an optics module 102, acquisition and readout block 104, a processing block 106, and a fused algorithm module 108. Output from the fused algorithm module 108, such as target detection data, target tracking data, and/or scene reconstruction data can be provided to an analyst 110 that can apply the information to a decision module 112 for making decisions, e.g., tactical decisions.

The optics module 102 includes lenses and/or optics that focus light reflected or emanating from a dynamic scene on one or more components of the acquisition and readout block 104. The acquisition and readout block 104 includes a focal plane array (FPA) and read-out integrated circuit (ROIC) 120 and a dynamic vision system (DVS) and ROIC 130. The FPA/ROIC 120 is configured for synchronous acquisition of intensity images based on sensed light of the focused light received from the optics module 102 and readout of the intensity images. Image acquisition and readout by the FPA/ROIC has high spatial resolution but low temporal resolution relative to DVS/ROIC 130. The FPA/ROIC 120 can include an FPA for acquiring images in different spectrums, including, for example and without limitation, the visible spectrum, long-wave infrared (LWIR) spectrum, medium-wave infrared (MWIR) spectrum, near infrared (NIR), and short-wave infrared (SWIR) spectrum. The FPA/ROIC 120 further includes a ROIC for reading out signals sensed by the FPA.

The FPA/ROIC 120 is a frame-based imaging system that captures a relatively large amount of data per frame. When the temporal resolution (frame rate) or spatial resolution is increased, the amount of data generated can increase exponentially. The large amount of data consumes large amounts of memory, power, and bandwidth. Much of the data from frame-to-frame is redundant. The spatial and temporal resolution of conventional FPA/ROIC can be limited in applications that have limited memory, power, and/or data bandwidth capabilities.

The DVS/ROIC 130 is configured for asynchronous acquisition of event data and readout of the event data based on sensed light of the focused light received from the optics module 102 and readout of the event data. Asynchronous data is data that is not synchronized when it is sent or received. In this type of transmission, signals are sent between the computers and external systems or vice versa in an asynchronous manner. This usually refers to data that is transmitted at intermittent intervals rather than in a steady stream. DVS/ROIC 130 includes an event-driven sensor having an FPA, such as a dynamic vision sensor or an asynchronous time-based image sensor (ATIS) for enabling neuromorphic vision.

The DVS is configured to have a resolution sufficient to image details of an object (e.g., a target) at a distance. The use of optics from the infrared camera system (e.g. SWIR, MWIR, LWIR, etc.) is used to bring a view of an object close to the 'imaging plane' of the DVS, allowing it to image the object. For example, the camera can have a resolution of 346×260 pixels (half of VGA resolution) with a dynamic range of 120 dB, bandwidth of 12M events/sec, pixel size of 18.5×18.5 um and configurable shutter (global or rolling). This would allow the DVS to image objects well if another optics system is used in tandem with it to bring the object close to the imaging plane of the DVS. The DVS/ROIC 130 further includes a ROIC configured for reading out event data from the sensor and providing the event data to the fused algorithm module 108.

The processing block 106 includes a graphics-processing unit (GPU) 122 and a field programmable gate array (FPGA) or neuromorphic processing unit (NPU) 132 that each apply a dedicated neural network. The neural network can include a convolutional neural network CNN and/or a deep neural network DNN. The GPU 122 uses a first neural network to process the intensity images received from FPA/ROIC 120. Processing performed by GPU 122 is frame-based. The FPGA or NPU 132 uses a second neural network to process the event data received from DVS/ROIC 130. Processing performed by NPU 132 is event-based. The output from the GPU 122 and the FPGA or NPU 132 is provided to the fused algorithms module 108, as shown by arrows 113, such as for machine learning training and application of a trained machine learning process.

The GPU 122 and FPGA or NPU 132 perform ISR algorithms, for example and without limitations, algorithms that perform target detection (TD), target tracking (TT) and scene reconstruction. The result output from the GPU 122 and FPGA or NPU 132 are fused outputs 115. The fused outputs can identify a detected target and provide information about tracking the target. A non-limiting example of high-level fused output 15 for a detected missile is "missile, heading north, velocity 10 m/s" or "civilian vehicle, white Subaru™ Forester™, heading north, velocity 5 m/s". Such high-level fused outputs 115 provide actionable data that an analyst can use to quickly make a decision or a recommendation.

A camera that operates in any of the SWIR, LWIR, MWIR, NIR spectrum can be retrofitted to operate as FPA/ROIL 120. In embodiments, while not required, DVS/ROIL 130 can be designed with a priori knowledge of material used by sensors in a photodiode array (PDA) of the FPA. This can optimize camera performance in combination with the PDA. In the case of InGaA-based PDAs, the PDA's substrate can be thinned in order to extend its absorption wavelengths down to the visible portion of the EM spectrum, thus including SWIR, NIR, and visible wavelengths. Such modifications to the PDA would not require modifications to the DVS/ROIC 130. However, in order support longer wavelengths (i.e., MWIR through LWIR), the DVS/ROIC 130 would need to be configured for optimal operation with these specific wavelengths.

Figure 3:
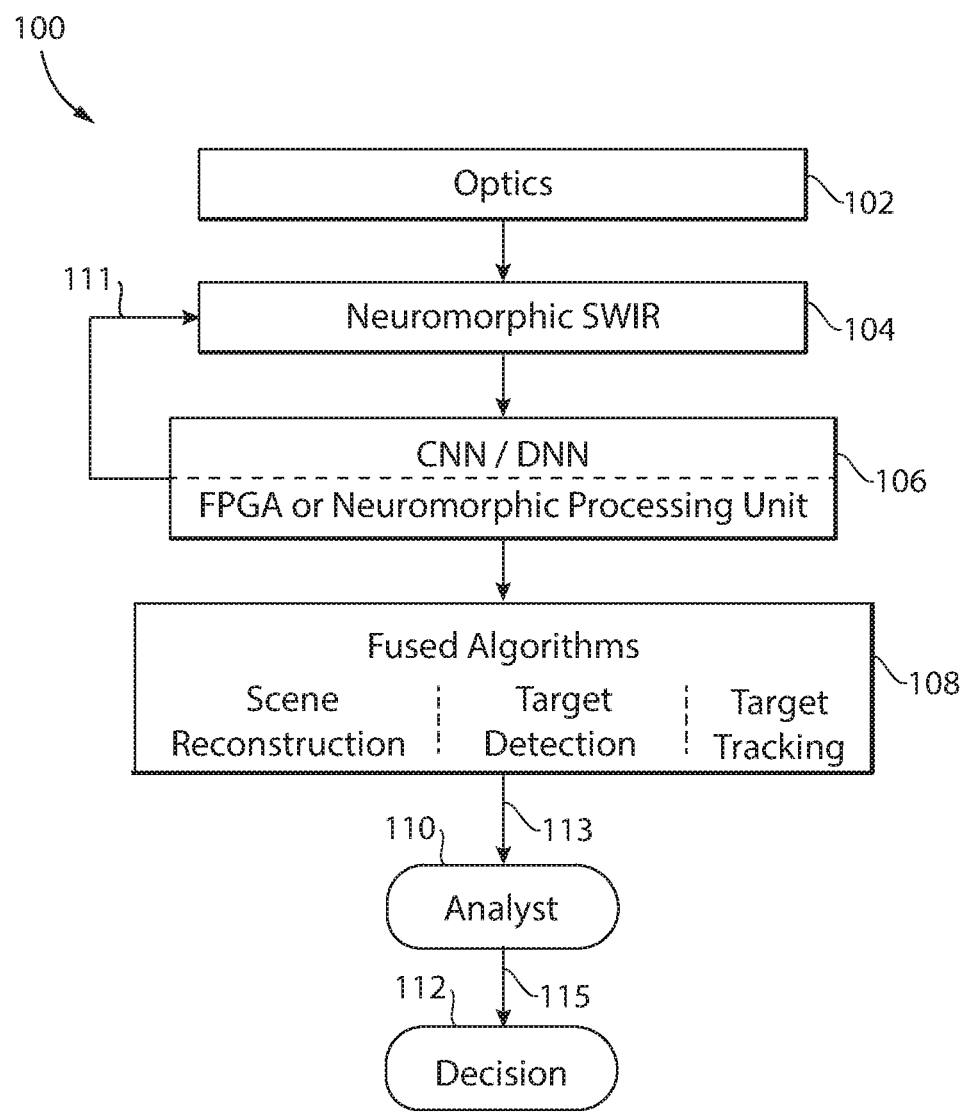
FIG. 3 is a schematic diagram of a vision system in accordance with another embodiment of the disclosure.

With reference to FIG. 3, the vision system 100 is shown, wherein acquisition and readout block 104 is configured as a single module that includes sensors for intensity image acquisition, such as an FPA, integrated with one or more event-driven sensors, such as a dynamic vision sensors or asynchronous time-based image sensors (ATISs). The FPA can be configured to sense light in a particular spectrum, such as visual, SWIR, NIR, MWIR, or LWIR. Acquisition and readout block 104 includes one ROIC that is configured to readout both synchronous intensity images and asynchronous event-based data. U.S. Pat. Nos. 9,641,781 and 9,698,182, for example, disclose examples of integration of an FPA with an event-driven sensor and provision of a single ROIC for reading out both synchronous intensity images and asynchronous event-based data, the subject matter of which is incorporated herein in its entirety.

Processing block 106 receives and processes both of the synchronous integrated images and the asynchronous event data output by acquisition and readout block 104 using a neural network (NN), such as a CNN and/or DNN. A neural network is typically composed of weighted filters of several, hierarchical interconnected layers. The neural network takes in the synchronous images and the asynchronous event data from the readout block 104 and outputs a new learned representation of this input data known as a feature map. Every entry in a feature map is equivalent to one neuron in a NN's layer. Each layer builds on the previous layer's feature extraction. The output of these hierarchical feature extractors is fed to a fully-connected NN that performs a classification task using the synchronous images and the asynchronous event data from the readout block 104.

The fused algorithm module 108 receives the output from the GPU 122 and the FPGA or NPU 132 (in FIG. 2) or processing block 106 (shown as an integrated block in FIG. 3). The data can be used to train one or more models as described further below. The data can further be used us input to a model, such as for target detection, target tracking, or scene reconstruction.

Since the target detection, target tracking, or scene reconstruction is enhanced by machine learning, a large amount of knowledge can be deduced from the small amount of event data, without the use of intensity images or with intensity images obtained at a relatively slow frame rate, wherein the slower frame rate reduces consumption of memory, power, and/or data bandwidth.

In the embodiments shown in both FIGS. 2 and 3, the light from the same source is incident simultaneously on the acquisition and readout module 104 for acquisition and readout of both the intensity images and the event data. In the embodiment(s) shown in FIG. 2, light from the same source is incident simultaneously on both the FPA/ROIC 120 and the DVS/ROIC 130. In embodiments, light from the same source is focused simultaneously on both the FPA/ROIC 120 and the DVS/ROIC 130 by one optics module 102. In the embodiment(s) shown in FIG. 3, the light that is incident on the acquisition and readout block 104 is simultaneously processed for acquisition of both the intensity images and the event data. In embodiments, light from the same source is focused on the acquisition and readout block 104 by one optics module 102 for simultaneous acquisition of the intensity images and the event data.

FIGS. 4, 5 and 7-10 show exemplary and non-limiting flowcharts. Before turning to description of FIGS. 4, 5 and 7-10 it is noted that the flowcharts in FIGS. 4, 5 and 7-10 shows an example in which operational steps are carried out in a particular order, as indicated by the lines connecting the blocks, but the various steps shown in this diagram can be performed in a different order, or in a different combination or sub-combination. It should be appreciated that in some embodiments some of the steps described below may be combined into a single step. In some embodiments, one or more additional steps may be included. In some embodiments, one or more of the steps can be omitted.

Figure 4:
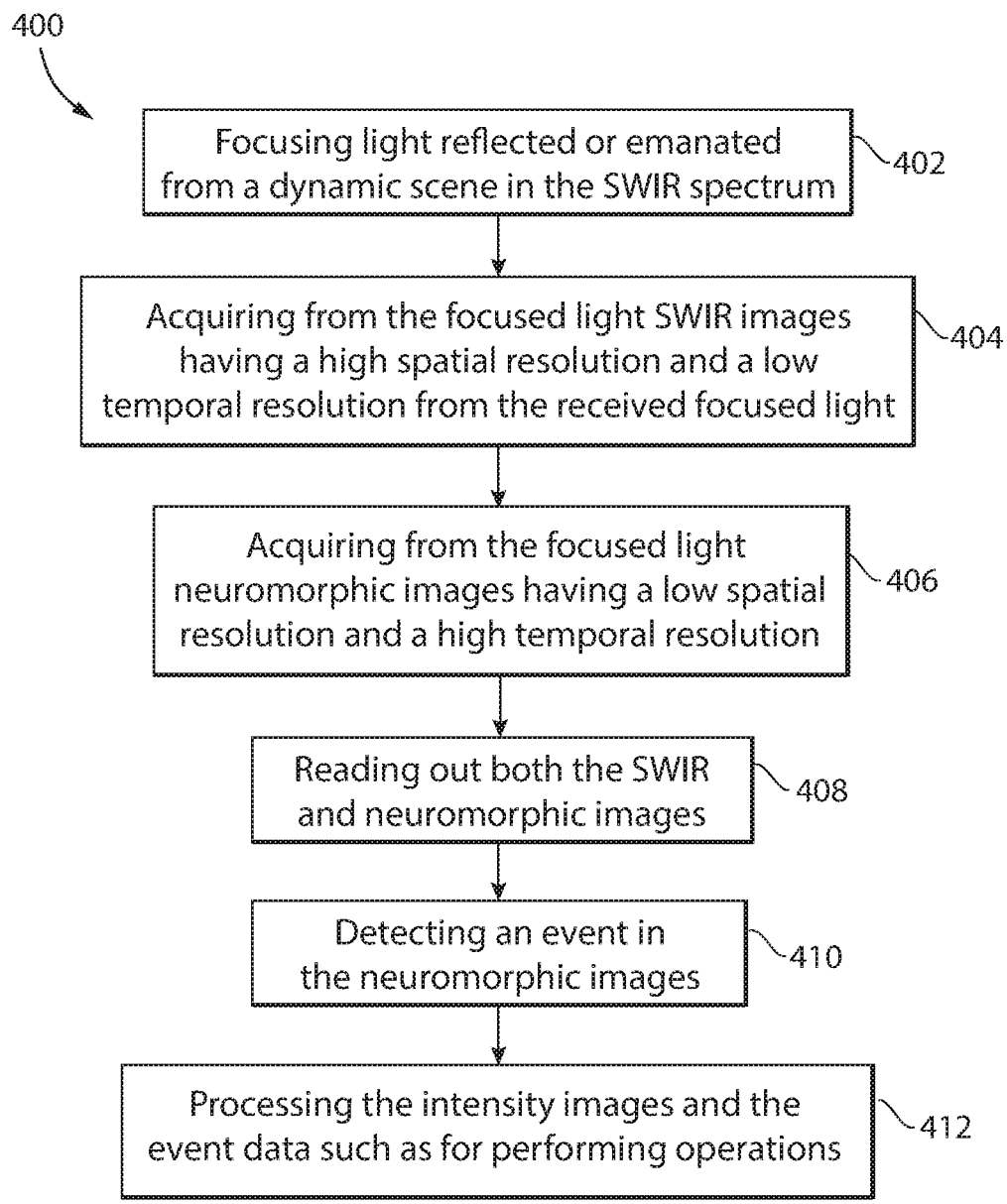
FIGS. 4, 5, and 8-11 are flowcharts of example methods performed by a vision system and its components in accordance with an embodiment of the disclosure.

With reference to FIG. 4, flowchart 400 illustrates a method for imaging in accordance with certain illustrated embodiments. The method can be performed by a vision system, such as vision system 100 shown in FIGS. 1-3. Operation 402 includes focusing light reflected or emanated from a dynamic scene in the short-wave infrared (SWIR) spectrum. Operation 404 includes acquiring from the focused light SWIR images having a high spatial resolution and a low temporal resolution from the received focused light. Operation 406 includes acquiring from the focused light event data having a high temporal resolution. Operation 408 includes reading out both the SWIR images and event data. The method shown in flowchart 400 can optionally further include operations 410-412. Operation 410 includes detecting an event in the event data. Operation 412 can include processing the SWIR images and the event data as a function of detection of the event such as for performing operations such as any of target detection, target tracking, scene reconstruction, performing training for generating a model that can be used for performing operations such as any of target detection, target tracking, scene reconstruction, etc.

Figure 5:
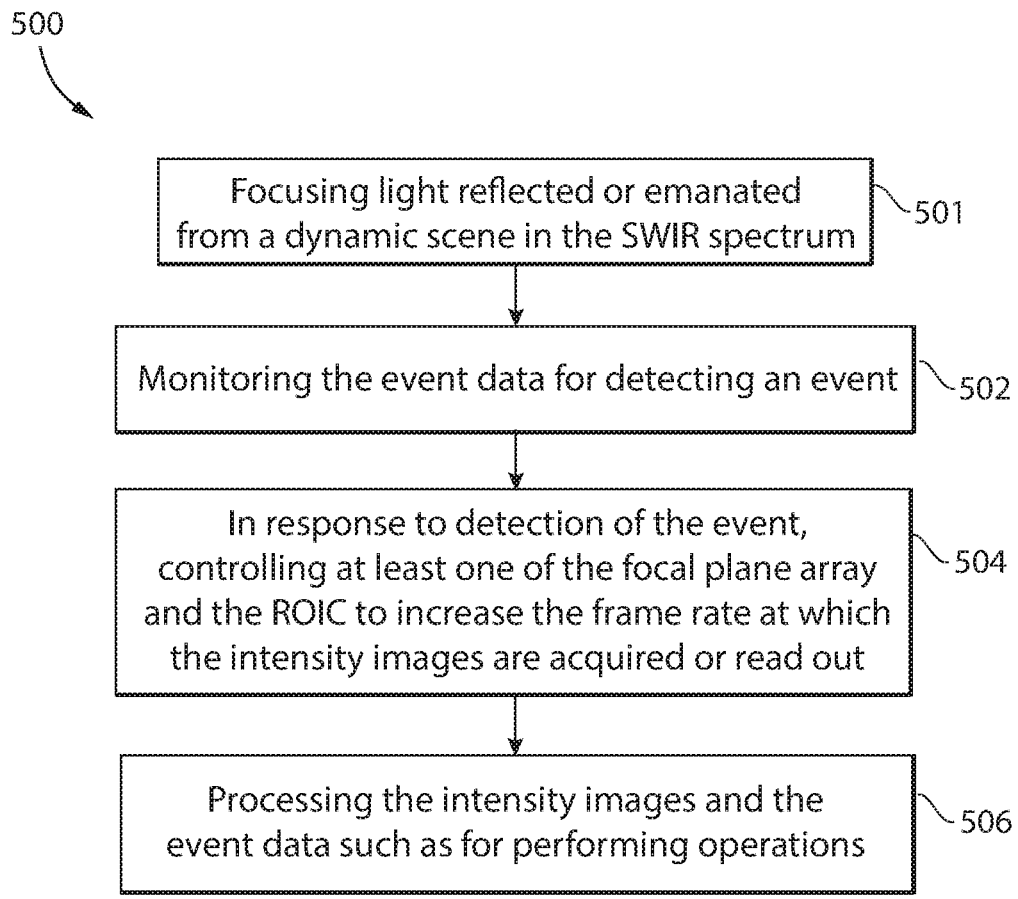

With reference to FIG. 5, flowchart 500 illustrates a method for imaging a target in accordance with certain illustrated embodiments. The method can be performed by a vision system, such as vision system 100 shown in FIGS. 1-3. Operation 502 includes monitoring the event data for detecting an event. Operation 504 includes, in response to detection of the event, controlling at least one of the focal plane array and the ROIC to increase the framerate at which the intensity images are acquired or read out. In one or more embodiments, the FPA operates in the short wave infrared (SWIR) spectrum. In one or more embodiments, the FPA operates in the NIR, MWIR, LWIR, or visible spectrums. Control signals for controlling the framerate of intensity image acquisition is represented as arrow 111 in FIGS. 2 and 3. In FIG. 2, FPGA or NPU 132 performs the event detection and sends a control signal, as represented by arrow 111, to the FPA/ROIC 120. In FIG. 3, processing block 106 performs the event detection and sends a control signal, as represented by arrow 111, to the acquisition and readout block 104.

The method shown in flowchart 500 can optionally further include operations 501, 506, and 508. Operation 501 includes focusing light reflected or emanated from a dynamic scene by an optics module, such as optics module 102 shown in FIGS. 2 and 3. This optics module can be a single optics module.

Operation 506 can include, in response to a target associated with the event detected is no longer being tracked, decreasing the framerate to a third framerate. Operation 508 can include processing the intensity images and the event data such as for performing operations such as any of target detection, target tracking, scene reconstruction, performing training for generating a model that can be used for performing operations such as any of target detection, target tracking, scene reconstruction, etc., in accordance with the disclosure.

Figure 6:
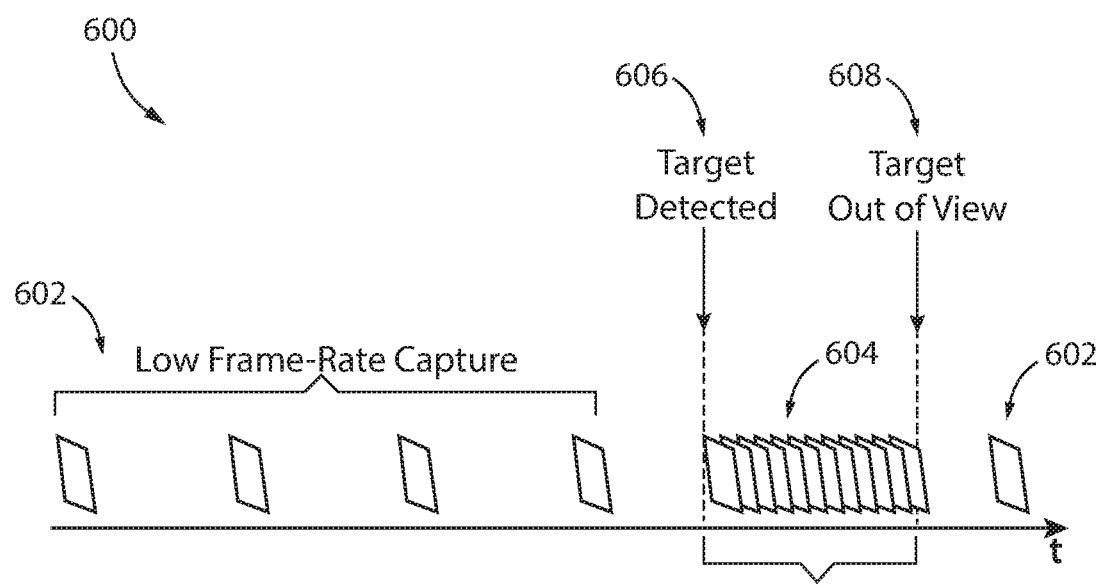
FIG. 6 is a schematic diagram of adjustment of intensity image frame rates in accordance with an embodiment of the disclosure.

FIG. 6 shows a diagram of frames 600 of intensity images generated by an FPA, such as FPA/ROIC 120 or an FPA included in acquisition and readout block 104. Frames 600 includes first frames 602 that are acquired at a slow frame rate and second frames 604 that are acquired at a fast frame rate in accordance with the control signal represented by arrow 111. While first frames 602 are acquired, event data output by DVS/ROIC 130 or acquisition and readout block 104 is monitored for detection of an event at time 606 the intensity images are acquired or readout as second frames 604 at a faster rate. When a target associated with the event detected is no longer being tracked, the intensity images are acquired or readout at a slower framerate as first frames 602. In one or more embodiments, the framerate is decreased to the same framerate as for acquiring first frames 602. In one or more embodiments, the framerate is decreased to a different framerate that is slower or faster than the framerate used for acquiring first frames 602, but is slower than the framerate used for acquiring second frames 604.

Figure 7A:
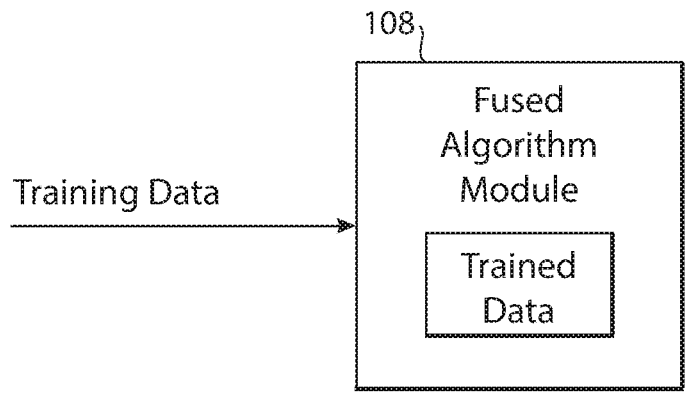
FIGS. 7A and 7B are block diagrams of a fused algorithm module of the vision system in a training mode and a trained mode in accordance with an embodiment of the disclosure.
Figure 7B:
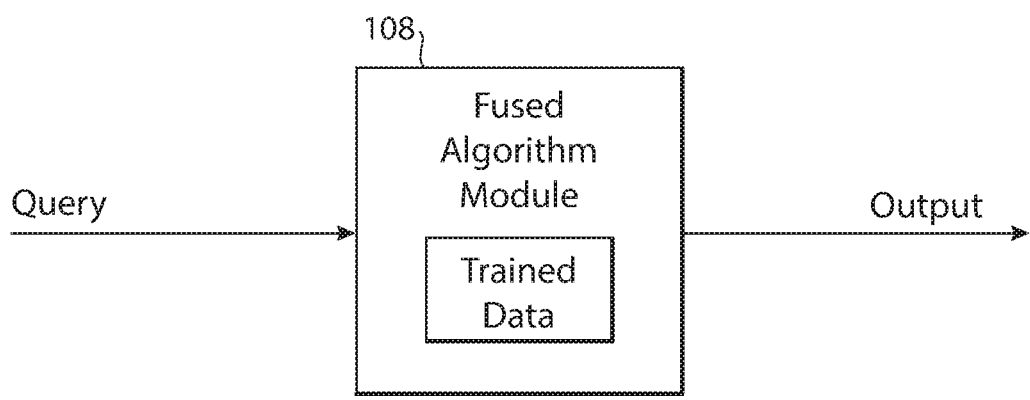

With reference to FIGS. 7A and 7B respectively, the fused algorithm module 108 is shown in an offline training phase and an online application phase. With reference to FIG. 7A, the fused algorithm module 108 receives training data, performs a training algorithm, and creates trained data, which can be model and/or a template. The training data is acquired intensity images and event data. The trained data can include a model configured for performing scene reconstruction and/or a template configured for target identification, detection, and/or tracking.

With reference to FIG. 7B, the fused algorithm module 108 receives query data and uses the trained data to generate an output. In one or more embodiments in which the trained data includes a reconstruction model configured for performing scene construction, the query can be two consecutive intensity images having acquisition times that define a window, and the output can be a new intensity image having an acquisition time in the window that is reconstructed, by applying the reconstruction model, from the two consecutive intensity images. An example method for reconstruction in a different application can be found at Scheerlinck, C., Barnes, N., & Mahoney, R., *Continuous-time intensity estimation using event cameras*, Asian Conference on Computer Vision (pp. 308-324), Springer, Cham (December, 2018).

In one or more embodiments in which the trained data includes the template, the query can be an image query or a segment of acquired event data query. The output can be a trained intensity image or trained event data that correlates to an entry in the template determined to match the query.

When the query is an image query, an entry in the template with trained image data that matches (based on a matching threshold) the image query is determined. The fused algorithm module 108 outputs the determined entry's trained event data. When the query is a segment of acquired event data query, an entry in the template with trained event data that matches (based on a matching threshold) the segment of acquired event data query is determined. The fused algorithm module 108 outputs the determined entry's trained intensity image.

Figure 8:
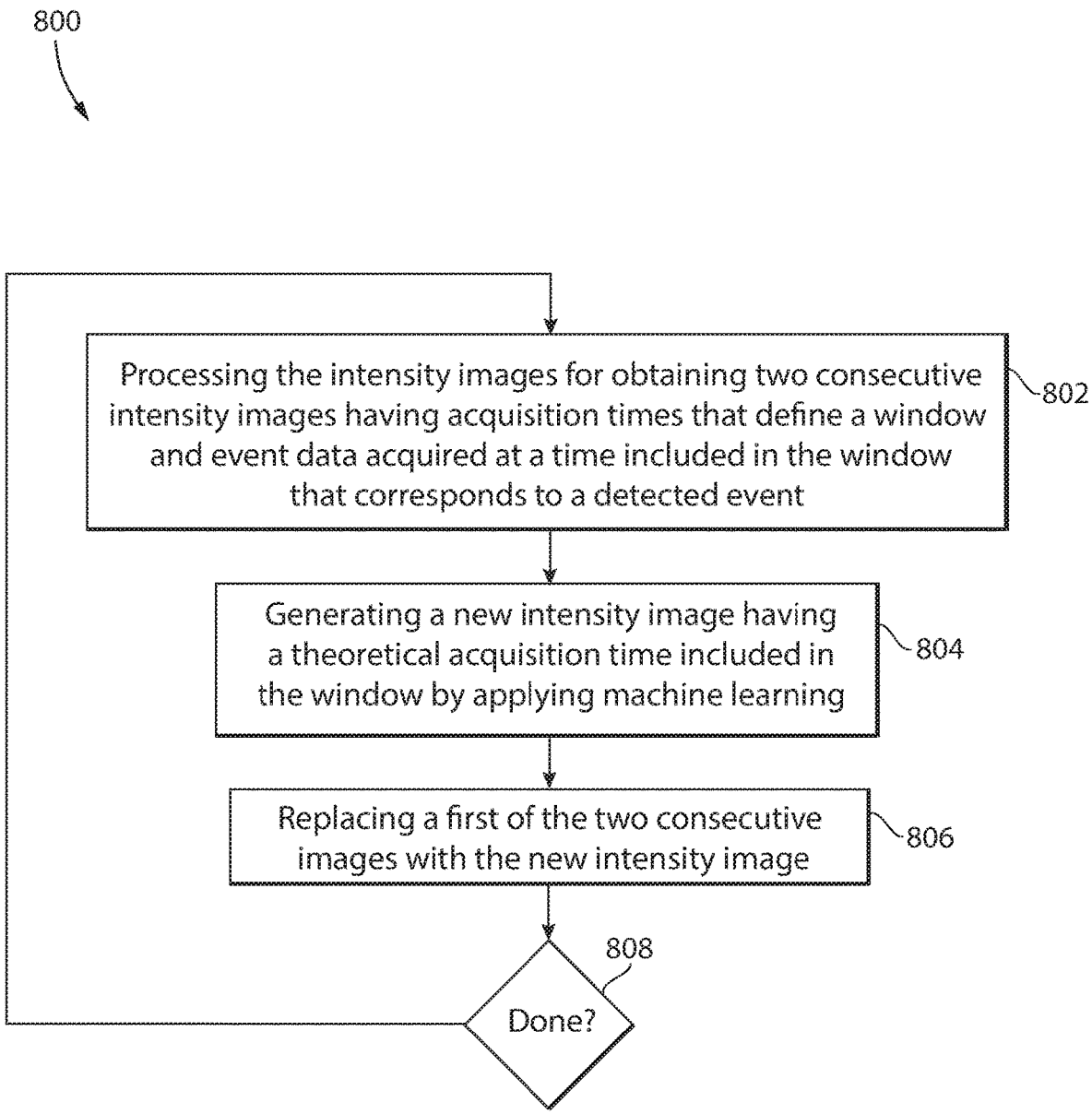

With reference to FIG. 8, flowchart 800 illustrates a method for performing scene reconstruction of intensity images using acquired event data in accordance with certain illustrated embodiments, wherein the intensity images and event data are acquired from focused light reflected and/or emanated from the same scene at the same time. The intensity images are acquired from an FPA and the event data is acquired from a neuromorphic vision system. The intensity images have a high spatial resolution and a low temporal resolution, whereas the event data has a high temporal resolution. The method can be performed by a fused algorithm module such as fused algorithm module 108 shown in FIGS. 2 and 3. Operation 802 includes processing acquired intensity images for obtaining two consecutive intensity images having acquisition times that define a window and event data acquired at a time included in the window that corresponds to a detected event. Operation 804 includes generating a new intensity image having a theoretical acquisition time included in the window by applying machine learning. Operation 806 includes inserting the new intensity image in between the two consecutive images. At operation 808, a determination is made whether the scene reconstruction is completed for the two consecutive intensity images. This determination can be based on the number of iterations performed, an acquisition time difference between the new intensity image and a different image, such as the new intensity image generated in a previous iteration or one of the two consecutive intensity images, or a parameter of the new intensity image.

Figure 9:
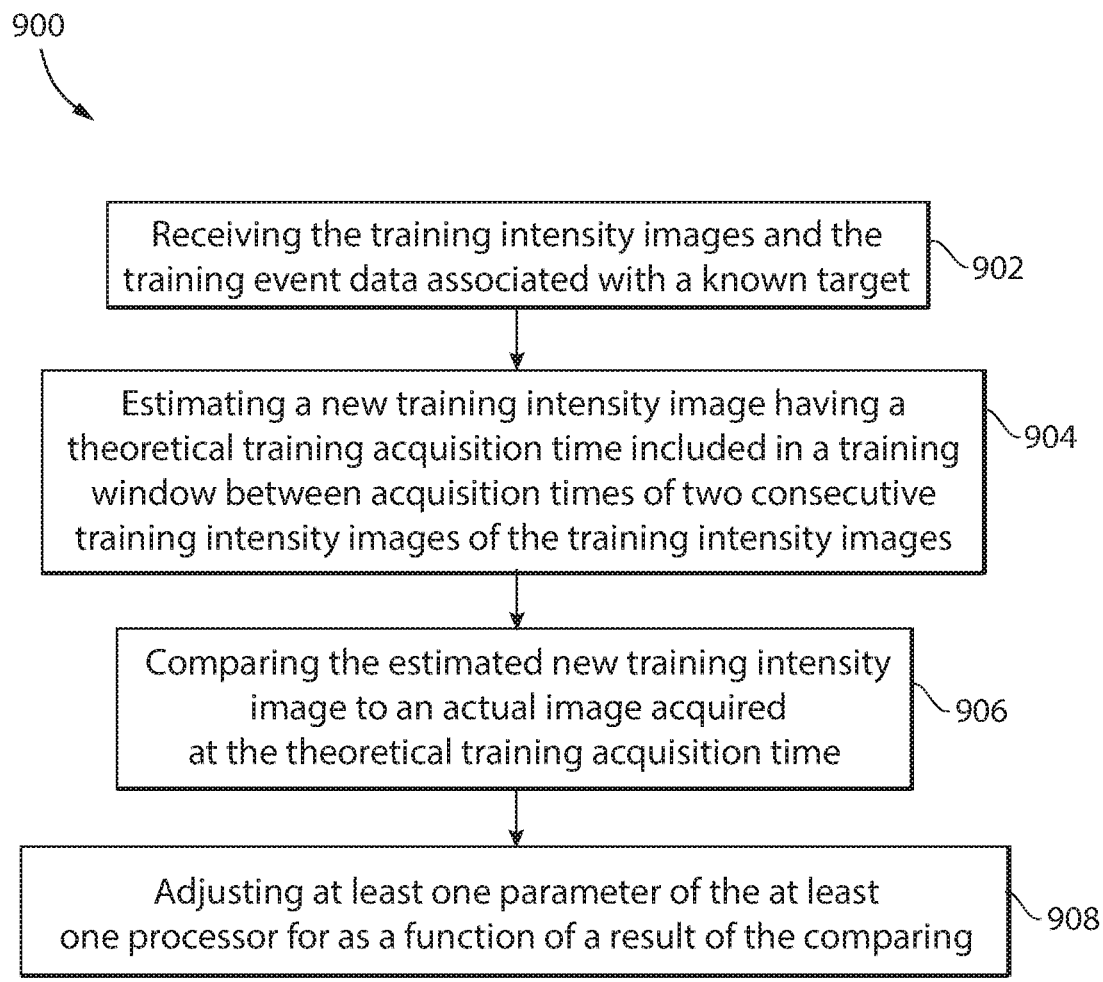

With reference to FIG. 9, flowchart 900 illustrates a method for training a model for performing scene reconstruction using training intensity images and training event data in accordance with certain illustrated embodiments, wherein the training intensity images and training event data are acquired from focused light received from the same source at the same time. The training intensity images are acquired from an FPA and the training event data is acquired from a neuromorphic vision system. The training intensity images have a high spatial resolution and a low temporal resolution, whereas the training event data has a low spatial resolution and a high temporal resolution. The method can be performed by a fused algorithm module, such as fused algorithm module 108 shown in FIGS. 2 and 3.

Operation 902 includes receiving the training intensity images and the training event data associated with a known target. Operation 904 includes estimating a new training intensity image having a theoretical training acquisition time included in a training window between acquisition times of two consecutive training intensity images of the training intensity images. Operation 906 incudes comparing the estimated new training intensity image to an actual image acquired at the theoretical training acquisition time. Operation 908 includes adjusting at least one parameter used for machine learning as a function of a result of the comparing.

Figure 10:
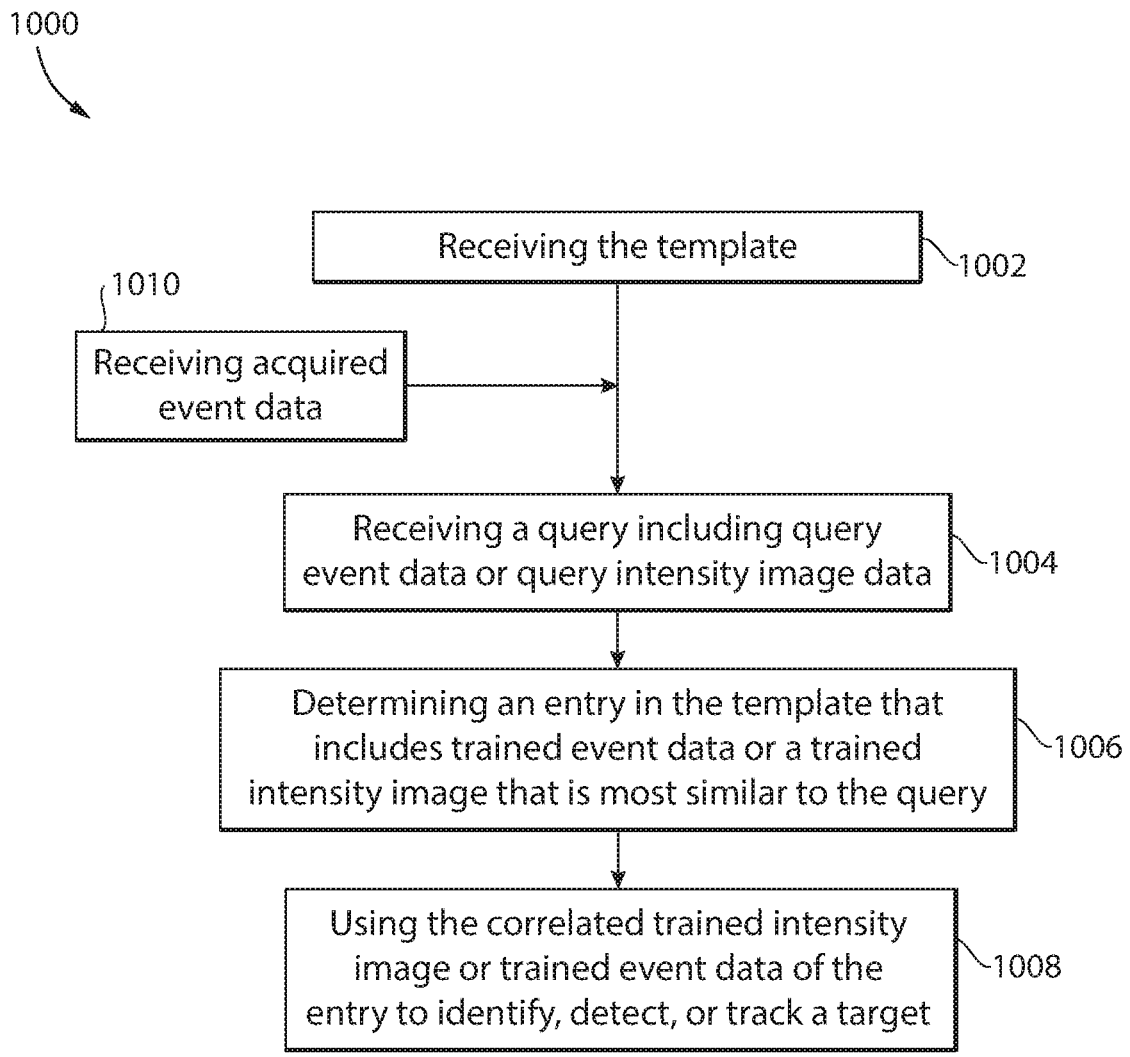

With reference to FIG. 10, flowchart 1000 illustrates a method for detecting and/or tracking a target in accordance with certain illustrated embodiments using a template and acquired event data, wherein the event data is acquired responsive to light reflected or emanated from a scene, using a neuromorphic vision system, such as vision system 100 shown in FIGS. 2 and 3. Operation 1002 includes receiving the template. The template, which includes a plurality of entries, is determined by machine learning training. Each entry includes trained event data that is correlated with one or more trained intensity images. The correlated trained event and one or more trained intensity images were acquired in response to light reflected or emanated from the same scene at the same time. The trained intensity images were associated with one or more respective possible targets of interest. The trained intensity images were acquired from an FPA and having a high spatial resolution and a low temporal resolution and the trained event data being acquired from the neuromorphic vision system and having a low spatial resolution and a high temporal resolution. Operation 1004 includes receiving a query including query event data or query intensity image data. Operation 1006 includes determining an entry in the template that includes trained event data or a trained intensity image that is most similar to the query. Operation 1008 includes using the correlated trained intensity image or trained event data of the entry to identify, detect, or track a target.

In accordance with one or more embodiments, the query includes a query intensity image, the event determined includes a trained intensity image that is most similar to the query intensity image, and the correlated trained event data of the entry is determined. The method can further include continuing to receive acquired event data at operation 1010. Operation 1008 can include determining similarity of the acquired event data to the correlated trained event data. The determination of similarity can be used to determine whether a new target is detected or a previously detected target has been detected again, which can be used for tracking the target and detecting new targets.

In accordance with one or more embodiments, the query includes a segment of the acquired event data, the event determined includes a trained event data that is most similar to the query's segment of acquired event data, and the correlated trained intensity image is determined. At operation 1008, the correlated trained intensity image determined at operation 1006 can be associated to the segment of the acquired event data and used for identifying the target associated with the segment of acquired event data query. This identification can help to repeatedly detect the target in order to track the target.

The method can further include continuing to receive acquired event data at operation 1010, in which another segment of the acquired event data can be provided as a query. The acquired event data can automatically be segmented into segments that are provided as queries. Such segmentation can be performed in CNN/DNN 106 or 132. Noise reduction can be performed in DVS/ROIC 130, and segmentation can be performed by clustering event data spatially within a small temporal window. Query events within that temporal window can be segmented from background based on the speed and direction of the clusters. Events pertaining to multiple objects can be segmented in a similar way. In accordance with one or more embodiments, the acquired event data is clustered by at least one of motion, magnitude and/or direction.

In accordance with one or more embodiments, determining the entry includes outputting a confidence score that represents confidence of the determination of the entry.

In accordance with one or more embodiments, determining the entry includes outputting a confidence score that represents confidence of the determination of the entry, wherein occlusion of the query intensity image affects the confidence score.

Figure 11:
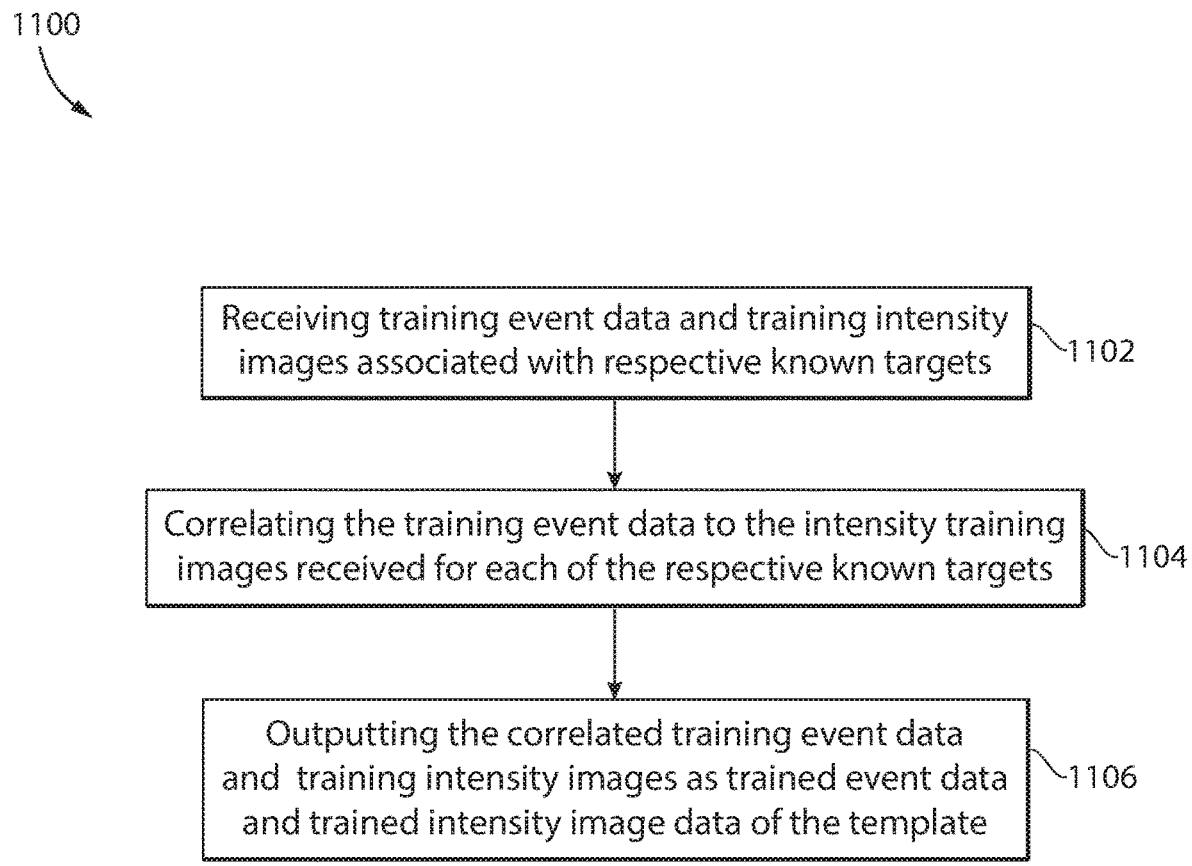

With reference to FIG. 11, flowchart 1100 illustrates a method for training a model by generating a template used to detect and/or track a target using training intensity images and training event data in accordance with certain illustrated embodiments. The training intensity images and training event data are acquired from focused light received from the same source at the same time. The training intensity images are acquired from an FPA and the training event data is acquired from a neuromorphic vision system. The training intensity images have a high spatial resolution and a low temporal resolution, whereas the training event data has a low spatial resolution and a high temporal resolution. The method can be performed by a fused algorithm module, such as fused algorithm module 118 shown in FIGS. 2 and 3.

Operation 1102 includes receiving training event data and training intensity images associated with respective known targets. Operation 1104 includes correlating the training event data to the intensity training images received for each of the respective known targets. Operation 1106 includes outputting the correlated training event data and training intensity images as trained event data and trained intensity image data of the template.

In accordance with one or more embodiments, generating the template further includes repeating receiving training event data and training intensity images associated with the same target of the respective known targets when the target is positioned in at least one different pose and/or the target is positioned at a different distance from the imaging system.

In accordance with one or more embodiments, the training event data is filtered by applying kernel density estimation.

In accordance with one or more embodiments, the trained event data is encoded by using shape descriptors.

Figure 12A:
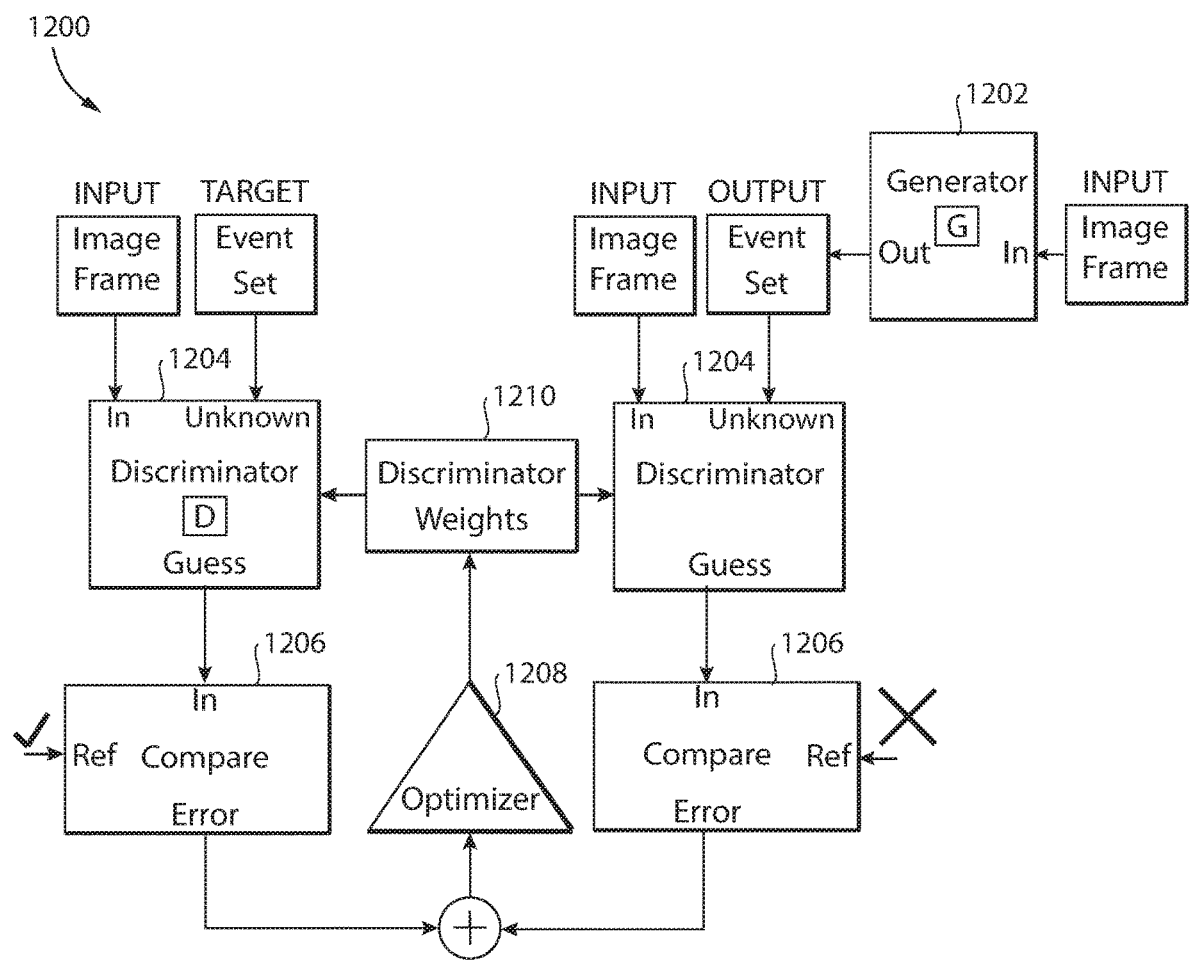
FIGS. 12A and 12B are flow diagrams of a method of training a neural network.
Figure 12B:
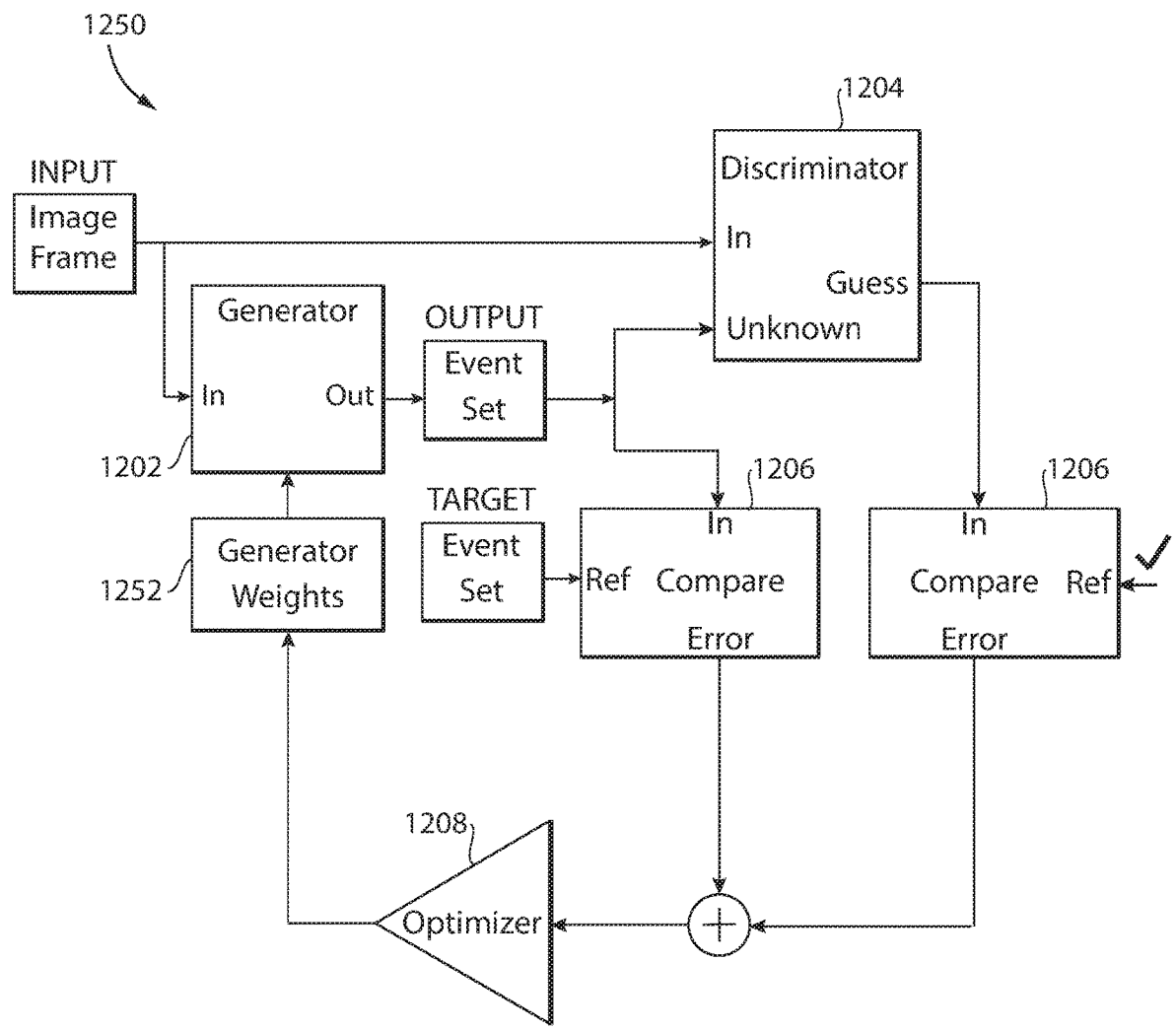

With reference to FIGS. 12A and 12B, an example discriminator side 1200 and generator side 1250 of a conditional adversarial network (cGAN) are each trained during an offline training phase for translating a query image into its event data equivalent. The cGAN is provided as an example, without limitation to a specific network, of a network that can be used for training a fused algorithm module, such as fused algorithm module 108 shown in FIGS. 2 and 3.

With reference to FIG. 12A, generator (G) 1202 transforms an input image frame into an output event set, while a discriminator (D) 1204 measures the similarity of the input image frame to an unknown event set (either a target event set from the dataset, or an output event set from the generator 1202) and tries to guess if this was produced by generator 1202.

A compare module 1206 calculates the error between two inputs, measuring a degree of similarity. An optimizer 1208 works to minimize errors between discriminator's 1204 guesses and the truth by setting discriminator weights 1210 accordingly.

During training, generator 1202 generates an output event set form the input image frame. Discriminator 1204 looks at the input image frame/target event set pair and the input image frame/output event set pair, and produces a guess about how realistic the pairs seem. A weights vector of the discriminator weights 1210 is then adjusted based on a classification error of the input image frame/target event set pair and the input image frame/output event set pair.

With reference to FIG. 12B, components already described with respect to FIG. 12A are shown with like reference numbers. Additional, FIG. 12B shows generator's weights 1252, which are adjusted based on output of the discriminator 1204 as well as a difference between the output event set and the target image frame. Since the generator's weights 1252 are based on the discriminator's output, as the discriminator 1204 performance improves, the generator 1202 performance improves as well, gradually creating output event sets that are actually representative of the input image frames.

Accordingly, image-to-event translation is trained in order to translate any image query into an equivalent event set of event data. Image-to-event translation also includes generation of multiple views of the input image frame to enable pose invariance for the target object Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

Figure 13:
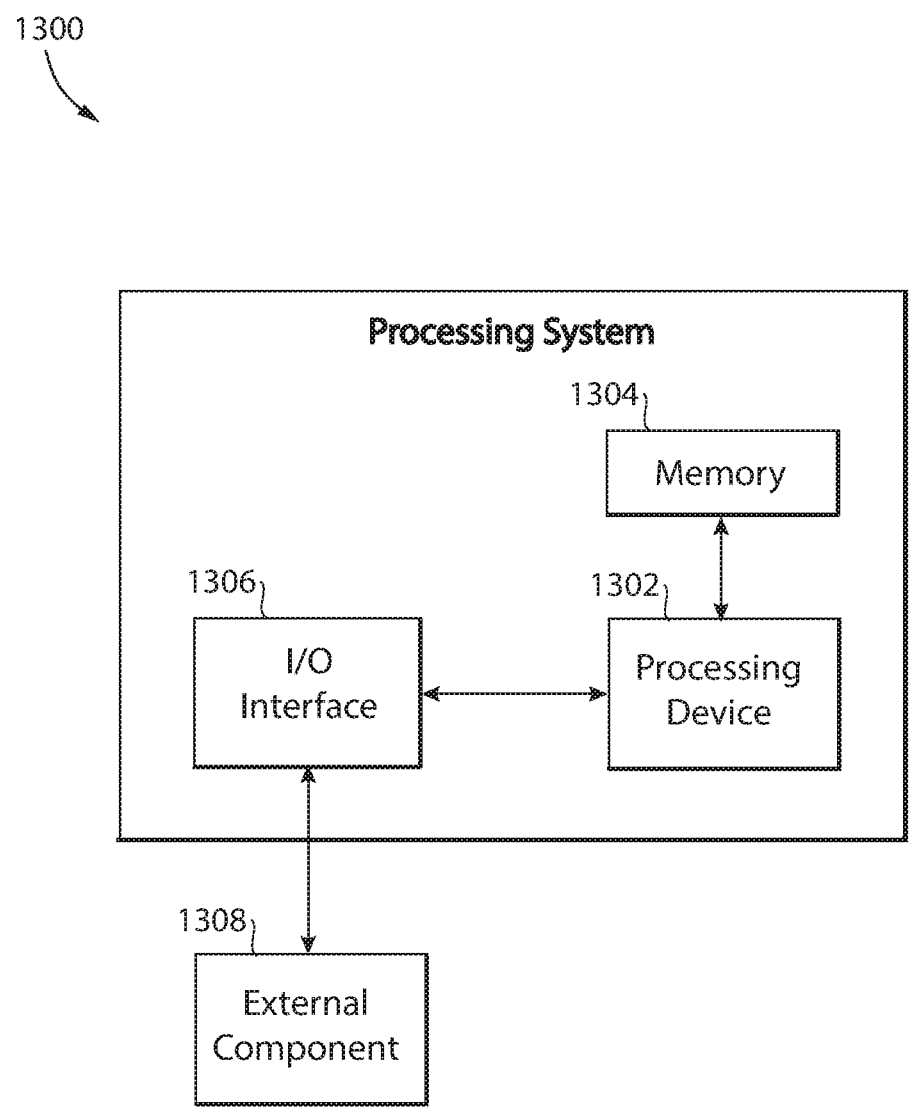
FIG. 13 is a block diagram of an exemplary computer system configured to implement components of the vision system in accordance with an embodiment of the disclosure.

With reference to FIG. 13, a block diagram of an example computing system 1300 is shown, which provides an example configuration of the controller 102 or one or more portions of vision system 100 and/or fused algorithm module 108. Computing system 1300 is only one example of a suitable system and is not intended to suggest any limitation as to the scope of use or functionality of embodiments of the disclosure described herein. Computing system 1300 can be implemented using hardware, software, and/or firmware. Regardless, computing system 1300 is capable of being implemented and/or performing functionality as set forth in the disclosure.

Computing system 1300 is shown in the form of a general-purpose computing device. Computing system 1300 includes a processing device 1302, memory 1304, an input/output (I/O) interface (I/F) 1306 that can communicate with an internal component 1310, and optionally an external component 1308.

The processing device 1302 can include, for example, a PLOD, microprocessor, DSP, a microcontroller, an FPGA, an ASCI, and/or other discrete or integrated logic circuitry having similar processing capabilities.

The processing device 1302 and the memory 1304 can be included in components provided in the FPGA, ASCI, microcontroller, or microprocessor, for example. Memory 1304 can include, for example, volatile and non-volatile memory for storing data temporarily or long term, and for storing programmable instructions executable by the processing device 1302. I/O I/F 1306 can include an interface and/or conductors to couple to the one or more internal components 1308 and/or external components 1310.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the vision system 100 and/or fused algorithm module 108 (or portions of vision system 100 and/or fused algorithm module 108) may be implemented or executed by one or more computer systems, such as a microprocessor. Each computer system 1300 can implement controller 102, or multiple instances thereof. In various embodiments, computer system 1300 may include one or more of a microprocessor, an FPGA, application specific integrated circuit (ASCI), microcontroller. The computer system 1300 can be provided as an embedded device. All or portions of the computer system 1300 can be provided externally, such by way of a mobile computing device, a smart phone, a desktop computer, a laptop, or the like.

Computer system 1300 is only one example of a suitable system and is not intended to suggest any limitation as to the scope of use or functionality of embodiments of the disclosure described herein. Regardless, computer system 1300 is capable of being implemented and/or performing any of the functionality set forth hereinabove.

Computer system 1300 may be described in the general context of computer system-executable instructions, such as program modules, being executed by a computer system. Generally, program modules may include routines, programs, objects, components, logic, data structures, and so on that perform particular tasks or implement particular abstract data types.

The vision system integrates acquisition of asynchronous neuromorphic event data with synchronous, framed intensity images. In one or more embodiments, the intensity images are SWIR images. In one or more embodiments, the intensity images have wavelengths in the visibility, NIR, MWIR, or LWIR spectrum. Machine learning is used to train a fused algorithm module to perform scene reconstruction and/or to identify, detect, and/or track targets. The fused algorithm module is trained using multiple views of training intensity images to provide pose (e.g., orientation) and scale invariance. Noise is reduced from training event data, e.g., by using kernel density estimation. A template stores entries of trained event data and correlated intensity image data. The trained event data can be encoded, such as by using shape descriptors. Once trained, queries can be submitted to the fused algorithm module. An intensity image or acquired event data can be submitted as a query. The acquired event data can be clustered by motion, magnitude, and/or direction before submission as the query. The query can be compared to the template entries to determine a degree of similarity. When the degree of similarity is above a predefined threshold or is the highest determined for the template entries, a match is determined and can be used to for performing target identification, detection, and/or tracking.

Accordingly, the application of machine learning to correlate event data and intensity images provides the ability of a platform having limited power, memory, and processing resources to use neuromorphic event detection to perform scene reconstruction and/or target identification, detection and/or tracking. Techniques such as filtering, clustering, and encoding event data improve reliability and the ability to compare and match query event data to trained event data in the template.

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment(s) disclosed, but that the disclosure will include all embodiments falling within the scope of the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An imaging system for imaging a target, the method comprising:
    a synchronous focal plane array for receiving the focused light and synchronously acquiring intensity images, the intensity images having a high spatial resolution and a low temporal resolution from the received focused light;
    an asynchronous neuromorphic vision system configured for receiving the focused light and asynchronously acquiring event data, the event data having a high temporal resolution;
    a read-out integrated circuit (ROIC) configured to readout both the intensity images and event data, wherein the focal plane array and the ROIC are initially configured for acquiring and reading out the intensity images at a low framerate; and
    at least one processing module configured for:
        asynchronously monitoring the event data for detecting an event;
        in response to detection of the event, controlling at least one of the focal plane array and the ROIC to increase the framerate at which the intensity images are acquired or read out from a first frame rate to a second frame rate;
        processing the intensity images for obtaining two consecutive intensity images and the event data, wherein each intensity image and event data has an acquisition time at which it was acquired, the acquisition times of the two consecutive intensity images defining a time window that includes an acquisition time of event data that corresponds to a detected event; and generating a new intensity image having a theoretical acquisition time included in the window by applying machine learning in which the at least one processing module was trained by machine learning techniques using intensity images and training event data associated with a known target.

2. The imaging system of claim 1, wherein the at least one processing module is further configured for decreasing the framerate to a third framerate when a target associated with the event detected is no longer being tracked.

3. The imaging system of claim 1, wherein the focus plane array operates in the short wave infrared (SWIR) spectrum.

4. The imaging system of claim 1, further comprising an optics module configured for focusing light reflected or emanated from a dynamic scene.

5. The imaging system of claim 4, wherein the optics module is a single optics module.

6. The imaging system of claim 1, wherein the at least one processing module is further configured to:
undergo the machine learning training, including receiving the training intensity images and the training event data associated with the known target;
estimate a new training intensity image having a theoretical training acquisition time included in a training window between acquisition times of two consecutive training intensity images of the training intensity images;
compare the estimated new training intensity image to an actual image acquired at the theoretical training acquisition time; and
adjust at least one parameter used for machine learning as a function of a result of the comparing.

7. The imaging system of claim 1, wherein the at least one processor performs the screen reconstruction recursively by repeating performing the screen reconstruction using the intensity image as one of the two consecutive intensity images.

8. The imaging system of claim 1, wherein the at least one processing module is further configured for:
receiving a template of trained event data determined by machine learning training, wherein the template correlates trained event data to trained intensity images associated with one or more respective possible targets of interest;
comparing a portion of the acquired event data to the template; and
determining as a function of a result of the comparison a trained intensity image in the template that is correlated to the portion of the acquired event data.

9. The imaging system of claim 8, wherein the at least one processing module is further configured to:
undergo the machine learning training, including generating the template, wherein generating the template comprises:
receiving training event data and training intensity images associated with respective known targets; and
correlating the training event data to the intensity training images received for each of the respective known targets.

10. The imaging system of claim 9, wherein the training event data is filtered by applying kernel density estimation.

11. The imaging system of claim 9, wherein the trained event data is encoded by using shape descriptors.

12. The imaging system of claim 8, wherein determining the trained intensity image that is correlated to the portion of the acquired event data includes outputting a confidence score that represents confidence of the determination.

13. The imaging system of claim 10, wherein occlusion of a target when acquiring the event data affects the confidence score.

14. The imaging system of claim 9, wherein generating the template further comprises:
repeating receiving training event data and training intensity images associated with one target of the respective known targets when the target is positioned in at least one different pose and/or the target is positioned at a different distance from the imaging system; and
correlating the training event data to the intensity training images received for the target.

15. A method of processing intensity images of a dynamic scene acquired using a template and asynchronously acquired event data, wherein the event data is acquired responsive to light reflected or emanated from a scene using a neuromorphic vision system, the acquired event data having a high temporal resolution, the method comprising:
receiving a template, the template being determined by machine learning training, wherein the template includes a plurality of entries, each entry including trained event data that is correlated with one or more trained intensity images, wherein the correlated trained event and one or more trained intensity images were acquired in response to light reflected or emanated from the same scene at the same time, the trained intensity images being associated with one or more respective possible targets of interest, the trained intensity images being acquired synchronously from an FPA and having a high spatial resolution and a low temporal resolution and the trained event data being acquired asynchronously from the neuromorphic vision system and having a high temporal resolution;
receiving a query including query event data or query intensity image data;
determining an entry in the template that includes trained event data or a trained intensity image that is most similar to the query; and
using the correlated trained intensity image or trained event data of the entry to identify, detect, or track a target.

16. The method of claim 15, wherein the query includes a query intensity image, the event determined includes a trained intensity image that is most similar to the query intensity image, and the correlated trained event data of the entry is determined, and the method further comprises:
receiving acquired event data;
determining similarity of the acquired event data to the correlated trained event data; and
detecting and/or tracking a target based on a result of the determination of similarity.

17. The method of claim 15, further comprising:
receiving acquired event data, wherein the query includes a segment of the acquired event data, the event determined includes a trained event data that is most similar to the query's segment of acquired event data, and the correlated trained intensity image is determined; and
associating the correlated trained intensity image determined to the segment of the acquired event data.

18. The method of claim 15, wherein the acquired event data is clustered by at least one of motion magnitude and/or direction.

19. The method of claim 15, wherein the at least one processing module is further configured to:
undergo the machine learning training, including generating the template, wherein generating the template comprises:
receiving training event data and training intensity images associated with respective known targets;
correlating the training event data to the intensity training images received for each of the respective known targets; and
outputting the correlated training event data and training intensity images as trained event data and trained intensity image data of the template.

20. The method of claim 19, wherein generating the template further comprises:
repeating receiving training event data and training intensity images associated with the same target of the respective known targets when the target is positioned in at least one different pose and/or the target is positioned at a different distance from the imaging system.

21. The method of claim 19, wherein the training event data is filtered by applying kernel density estimation.

22. The method of claim 19, wherein the trained event data is encoded by using shape descriptors.

23. The method of claim 15, wherein determining the entry includes outputting a confidence score that represents confidence of the determination of the entry.

24. The method of claim 16, wherein determining the entry includes outputting a confidence score that represents confidence of the determination of the entry, wherein occlusion of the query intensity image affects the confidence score.

* * * * *